W. P. HAMMOND.
SPEEDOMETER AND TIRE METER.
APPLICATION FILED NOV. 25, 1913.
1,138,653.
Patented May 11, 1915.
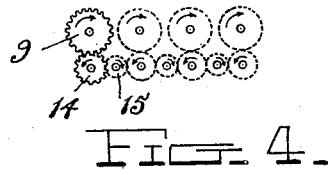
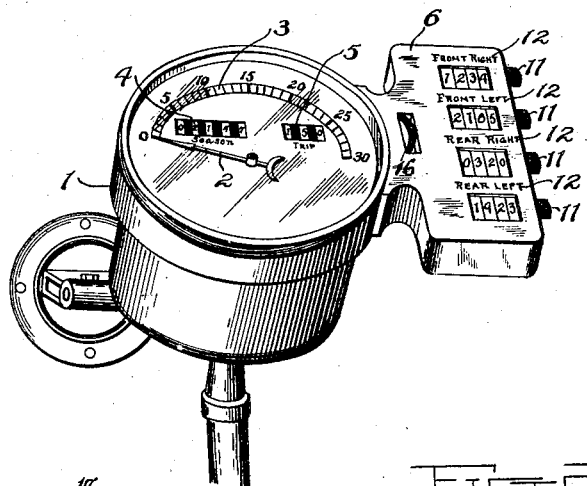
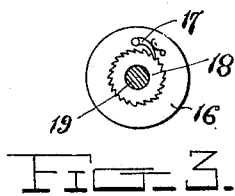
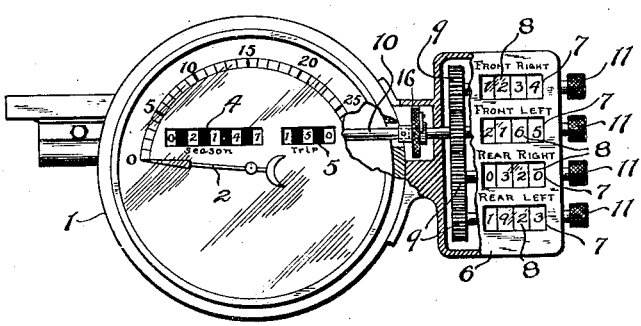
Witnesses
Harry B Rook.
Inventor
WILLIAM P. HAMMOND
By
Attorney

UNITED STATES PATENT OFFICE.

WILLIAM P. HAMMOND, OF NEW YORK, N. Y.

SPEEDOMETER AND TIRE-METER.

1,138,653.    Specification of Letters Patent.    Patented May 11, 1915.

Application filed November 25, 1913. Serial No. 802,984.

*To all whom it may concern:*

Be it known that I, WILLIAM P. HAMMOND, citizen of the United States, residing at New York, in the county of New York and State of New York, have invented certain new and useful Improvements in Speedometers and Tire-Meters, of which the following is a specification.

The present invention relates to a combined speedometer and tire meter, the object of the invention being to provide a device of this character which embodies novel features of construction whereby a separate and distinct meter is provided for each of the tires of the vehicle, the meter being set to a zero position when a new tire is placed upon the wheel so as to give the entire mileage of the tire when it is worn out and must be discarded.

It is customary for tire manufacturers to guarantee a minimum mileage for their tires and to make an adjustment with purchasers where a tire gives less than the minimum mileage. The present practice of keeping track of tire mileage is very unsatisfactory, however, since in applying for an adjustment the average motorist simply states that a tire has run an imaginary number of miles and is disgruntled if the dealer questions the accuracy of his statement. It is also common to make a note of the total mileage appearing on the speedometer when placing a new tire on a machine and to subtract this from the total mileage appearing on the speedometer when the tire must be discarded, although this record is seldom kept with any degree of care and is liable to error and mistake and to be unsatisfactory.

The object of the present invention has accordingly been to provide a tire meter which is constructed in combination with the speedometer and maintains a separate record for each tire, thereby providing a basis for adjustment which is accurate and must be satisfactory both to the motorist and the tire manufacturer or dealer.

With this and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a perspective view of a speedometer and tire meter constructed in accordance with the invention. Fig. 2 is a top view of the same, portions being broken away and shown in section. Fig. 3 is a detail view of the pawl and ratchet mechanism between the resetting wheel of the "trip" odometer and the main drive shaft of the tire meters. Fig. 4 is a side elevation of the train of gears operating the registers.

Corresponding and like parts are referred to in the following description and indicated in all the views of the drawings by the same reference characters.

Specifically describing the present embodiment of the invention, the numeral 1 designates a speedometer which may be of any conventional construction. This speedometer is shown as provided with the usual pointer 2 mounted to play over a scale 3 to indicate the speed of the machine, and also with a "season" odometer 4, as well as a smaller "trip" odometer 5. The odometer 4 operates in the usual manner to give the total mileage for the season, while the odometer 5 has a smaller capacity and serves to give the mileage of each trip, being set to a zero position when starting.

A casing 6 is applied to one side of the speedometer 1, the top of the casing being formed with a series of view openings 7 through which the readings of a series of separate and distinct odometers 8 are visible. One of the sight openings 7 and odometers 8 is provided for each tire of the vehicle, and the several odometers are connected together by intermeshing gearing so as to be operated in unison. Each of the odometers 8 is provided at one end thereof with a gear 9, the said gears meshing with pinions 14 arranged immediately below the same, and idlers 15 are interposed between the various pinions 14. It will thus be seen that all of the odometers 8 are connected together by a chain of gearing so as to be operated in unison, and that the gearing is so arranged that all of the several gear wheels 9 turn in the same direction.

The shaft 10 of the "trip" odometer is provided with a resetting wheel 16 by means of which the said "trip" odometer can be readily turned back to the zero position. A spring pawl 17 mounted upon the resetting wheel 16 engages a ratchet wheel 18 upon the main operating shaft 19 of the tire meter, the said main operating shaft being rigid with one of the gear wheels 9. As long as the shaft 10 of the "trip" odometer 5 is driven in a forward direction, the main operating shaft 19 of the tire meter is also rotated so as to operate the various odometers 8, although upon a reverse rotation of the shaft 10 through the medium of the resetting wheel 16, the pawl 17 slips over the ratchet wheel 18 so that the readings of the several odometers 8 are not changed when the "trip" odometer is reset to a zero position.

The several odometers 8 may be of the ordinary well known trip resetting construction, being each provided with a resetting knob 11 by means of which they can be quickly turned to zero position. Suitable characters 12 may be placed upon the casing 6 adjacent each of the sight openings 7 so as to indicate the exact tire whose milage is being recorded by the particular odometer under the sight opening. In the present instance the words "Front right" appear over the upper sight opening 7, referring to the tire upon the front right wheel, the words "Front left" over the second sight opening 7, referring to the tire upon the front left wheel, the words "Rear right" over the third sight opening 7, referring to the tire upon the rear right wheel, and the words "Rear left" over the lower sight opening 7, referring to the tire on the rear left wheel.

When a new tire is placed upon any one of the wheels of the vehicle, the corresponding odometer 8 is set to a zero position. This odometer is left untouched until the tire is worn out and must be discarded, and the reading given by the odometer at this time is the total mileage of the tire. An accurate registration is thus kept, which is free from guess work and the possible errors in making and keeping readings taken from the "season" odometer of the speedometer. These independent registrations of the mileage of the various tires, as kept by the respective odometers 8 of the tire meter may be always inspected by the dealer and should form a basis of adjustment mutually satisfactory to both parties.

Having thus described the invention, what I claim as new and desire to secure by Letters Patent, is:—

1. A tire meter attachment for speedometers including a plurality of registering devices distinct from the ordinary trip and total registers of the speedometer and driven synchronously therewith.

2. A tire meter attachment for speedometers including a casing, a series of independent registering odometers within the casing, gearing between the several registering odometers, and a driving connection between one of the registering odometers and the odometer of the speedometer, the series of registering odometers being distinct from the odometer of the speedometer and driven synchronously therewith.

3. A tire meter attachment for speedometers, including a casing, a series of independent registering odometers mounted within the casing, indicating means for identifying each odometer with some particular wheel, and a driving connection between the several odometers and the odometer of the speedometer, the said odometers being distinct from the odometer of the speedometer and driven synchronously therewith.

4. A tire meter attachment for speedometers including a casing, a series of registering odometers mounted within the casing and identified with the different wheels of the vehicle, one of the registering odometers being provided with a main operating shaft, gearing between the several registering odometers, and an operative connection between the said main driving shaft and the resetting wheel of the odometer speedometer.

5. A tire meter attachment for speedometers including a casing, a series of registering odometers mounted within the casing and identified with the different wheels of the vehicle, one of the registering odometers being provided with a main driving shaft, gearing between the several registering odometers, and a clutch connection between the main driving shaft and the resetting wheel of the odometer of the speedometer whereby the former is driven when the resetting wheel is rotated in a forward direction but is disengaged from the resetting wheel when the same is rotated backwardly.

6. A tire meter including a plurality of synchronously driven registering devices, means for identifying each of said devices with a different wheel of the vehicle, a common driving shaft for operating the registering devices and means operatively connecting said shaft with one of the wheels of the vehicle.

In testimony whereof I affix my signature in presence of two witnesses.

WILLIAM P. HAMMOND.

Witnesses:
LILLIAN L. MALZER,
P. FRANK SONNEK.